United States Patent
Ni et al.

(10) Patent No.: US 9,800,479 B2
(45) Date of Patent: Oct. 24, 2017

(54) PACKET PROCESSING METHOD, FORWARDER, PACKET PROCESSING DEVICE, AND PACKET PROCESSING SYSTEM

(71) Applicant: Huawei Technologies Co., Ltd., Shenzhen (CN)

(72) Inventors: Hui Ni, Beijing (CN); Shiyong Tan, Beijing (CN); Zhiwei Xiong, Shenzhen (CN); Hui Cai, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 148 days.

(21) Appl. No.: 14/819,241

(22) Filed: Aug. 5, 2015

(65) Prior Publication Data
US 2015/0341235 A1 Nov. 26, 2015

Related U.S. Application Data

(63) Continuation of application No. PCT/CN2013/071747, filed on Feb. 21, 2013.

(51) Int. Cl.
*H04L 12/26* (2006.01)
*H04W 24/00* (2009.01)
*H04L 12/741* (2013.01)

(52) U.S. Cl.
CPC ............ *H04L 43/062* (2013.01); *H04L 43/16* (2013.01); *H04W 24/00* (2013.01); *H04L 45/745* (2013.01)

(58) Field of Classification Search
CPC ....... H04W 24/00; H04L 43/062; H04L 43/16
USPC ........................................................ 370/392
See application file for complete search history.

(56) References Cited

U.S. PATENT DOCUMENTS

2013/0100951 A1    4/2013    Ishizuka

FOREIGN PATENT DOCUMENTS

| CN | 101111063 A | 1/2008 |
|---|---|---|
| CN | 102685006 A | 9/2012 |
| WO | 2011162215 A1 | 12/2011 |

OTHER PUBLICATIONS

International Search Report and Written Opinion of Patent Cooperation Treaty (PCT), International Application No. PCT/CN2013/07147, Applicant Huawei Technologies Co., Ltd., et al., date of mailing Aug. 25, 2015, 20 pages.

*Primary Examiner* — Ronald B Abelson
(74) *Attorney, Agent, or Firm* — Slater Matsil, LLP (57) ABSTRACT

Embodiments of the present invention disclose a packet processing method, a forwarder, a packet processing device, and a packet processing system that are applicable to a control and forwarding decoupled architecture including a forwarder and a controller. The method includes: acquiring, by the forwarder, packet reporting control information including a reporting control indication and a control threshold; and stopping, by the forwarder according to the reporting control indication in a case in which a control parameter reaches or exceeds the control threshold, sending a packet reporting message related to one flow.

15 Claims, 7 Drawing Sheets

PACKET PROCESSING METHOD, FORWARDER, PACKET PROCESSING DEVICE, AND PACKET PROCESSING SYSTEM

This application is a continuation of International Application No. PCT/CN2013/071747, filed on Feb. 21, 2013, which is hereby incorporated by reference in its entirety.

TECHNICAL FIELD

The present invention relates to network communications, and in particular, to a packet processing method, a forwarder, a packet processing device, and a packet processing system in a control and forwarding decoupled architecture.

BACKGROUND

On a current telecommunications network, there are many complex network devices, such as a router, a gateway, a switch, a firewall, and various types of servers. These devices separately support various types of network protocols, so as to implement interworking between network elements. Each device internally includes a packet forwarding module and various types of protocol control modules. In such a distributed deployment manner of control modules, deployment and management of a network are very complex, and in order to modify or update a control parameter, a network operator must separately operate each device.

In order to implement deployment flexibility and manageability of a network element, a software-defined network (SDN) concept is put forward in the industry. An SDN decouples control logic of the network element from a forwarding function, and deploys the control logic in a centralized manner, so that control and maintenance on a network can be simply implemented by operating a device on a control plane, so as to increase management efficiency of the network, and further simplify a device on a forwarding plane, which facilitates implementation of high performance and reusability of a forwarding device. Currently, an SDN idea is widely applied to a data center network and the telecommunications network, and a network based on the SDN idea is referred to as a network in a control and forwarding decoupled architecture.

On the network in the control and forwarding decoupled architecture, a controller is responsible for determining a forwarding action (such as forwarding, discarding, modifying a packet header, encapsulating, or decapsulating) of a service flow according to a feature of a packet (such as an IP quintuple, an Ethernet frame header, or a VLAN ID), and delivering a corresponding flow entry (including flow matching information (such as an IP quintuple or an Ethernet frame header) and an action that is correspondingly performed) to a forwarder, and the forwarder acquires and stores the flow entry, and performs a corresponding action on a subsequent packet conforming to the flow entry, so as to forward the packet.

In the prior art, each packet that cannot match any flow entry stored in a flow table may trigger one packet reporting message. Therefore, before the forwarder receives a flow entry installation message and successfully installs a flow entry, packets of a same flow also trigger multiple packet reporting messages.

For example, in a scenario of transmitting some packets of a large data volume, for example, burst transmission of a user packet, or simultaneous switching of a large quantity of users to a new forwarder, the forwarder may simultaneously receive a large quantity of user packets belonging to a same flow, which causes a large quantity of concurrent packet reporting messages. These packet reporting messages not only consume computing resources of the forwarder and the controller, but also occupy signaling transmission resources, which, for example, causes a failure to transmit the flow entry installation message, and further causes more packet reporting messages, making a control interface of an entire system be in an overload state.

SUMMARY

In view of this, a technical problem to be solved by the present invention is how to effectively reduce packet reporting messages in a control and forwarding decoupled architecture.

In order to solve the foregoing technical problem, according to an embodiment of the present invention, a packet processing method that is applicable to a control and forwarding decoupled architecture including a forwarder and a controller is provided, including: acquiring, by the forwarder, packet reporting control information, where the packet reporting control information includes a reporting control indication and a control threshold; and stopping, by the forwarder according to the reporting control indication in a case in which a control parameter reaches or exceeds the control threshold, sending a packet reporting message related to one flow to the controller.

For the packet processing method, in a possible implementation manner, the control threshold is maximum reporting frequency, and the control parameter is used for collecting statistics on frequency at which the packet reporting message related to the flow is sent; or, the control threshold is maximum reporting duration, and the control parameter is used for collecting statistics on duration in which the packet reporting message related to the flow is sent; or, the control threshold is a maximum quantity of reporting times, and the control parameter is used for collecting statistics on a quantity of times that the packet reporting message related to the flow is sent.

For the packet processing method, in a possible implementation manner, the forwarder acquires the packet reporting control information in one or more of the following manners: reading, by the forwarder, local configuration information, where the local configuration information includes the packet reporting control information; receiving, by the forwarder, a configuration message from the controller, where the configuration message carries the packet reporting control information; and receiving, by the forwarder, a flow entry installation message from the controller, where the flow entry installation message carries the packet reporting control information.

For the packet processing method, in a possible implementation manner, the method further includes: after stopping sending of the packet reporting message related to the flow, buffering, by the forwarder, an unreported packet of the flow into a buffer associated with or having a same identifier as a buffer of a reported packet of the flow, where the unreported packet refers to a packet for which a corresponding packet reporting message is not sent, and the reported packet refers to a packet for which a corresponding packet reporting message is sent; and receiving, by the forwarder, the flow entry installation message sent by the controller, and performing a processing action, which is defined in the flow entry installation message, on the buffered reported packet and unreported packet.

For the packet processing method, in a possible implementation manner, the method further includes: after stopping sending of the packet reporting message related to the flow, discarding, by the forwarder, the unreported packet of the flow, where the unreported packet refers to a packet for which a corresponding packet reporting message is not sent.

For the packet processing method, in a possible implementation manner, the packet reporting control information further includes a reporting threshold; and the packet processing method further includes: sending, by the forwarder, an unreported packet reporting message to the controller in a case in which a quantity of unreported packets of the flow reaches the reporting threshold, where the unreported packet refers to a packet for which a corresponding packet reporting message is not sent, and the unreported packet reporting message includes flow matching information and packet statistics.

For the packet processing method, in a possible implementation manner, the packet reporting control information further includes a reporting indication; and the packet processing method further includes: sending, by the forwarder, a reporting pause reporting message to the controller in a case in which the control parameter reaches the control threshold, where the reporting pause reporting message includes flow matching information and a reporting pause reason.

In order to solve the foregoing technical problem, according to another embodiment of the present invention, a forwarder is provided, including: a reporting control information acquiring unit, configured to acquire packet reporting control information, where the packet reporting control information includes a reporting control indication and a control threshold; and a reporting control unit, connected to the reporting control information acquiring unit, and configured to enable, according to the reporting control indication in a case in which a control parameter reaches or exceeds the control threshold, the forwarder to stop sending a packet reporting message related to one flow to a controller that decouples control from forwarding together with the forwarder.

For the forwarder, in a possible implementation manner, the control threshold includes one or more of maximum reporting frequency, maximum reporting duration, and a maximum quantity of reporting times, where the maximum reporting frequency indicates maximum frequency at which the forwarder is allowed to send a packet reporting message for one flow, and when frequency on which statistics is collected and at which a packet reporting message related to one flow is sent reaches or exceeds the maximum reporting frequency, the reporting control unit enables the forwarder to stop sending the packet reporting message related to the flow; the maximum reporting duration indicates maximum duration in which the forwarder is allowed to send a packet reporting message for one flow, and when duration on which statistics is collected and in which a packet reporting message related to one flow is sent reaches or exceeds the maximum reporting duration, the reporting control unit enables the forwarder to stop sending the packet reporting message related to the flow; and the maximum quantity of reporting times indicates a maximum quantity of times that the forwarder is allowed to send a packet reporting message for one flow, and when a quantity of times on which statistics is performed and that a packet reporting message related to one flow is sent reaches or exceeds the maximum quantity of reporting times, the reporting control unit enables the forwarder to stop sending the packet reporting message related to the flow.

For the forwarder, in a possible implementation manner, the reporting control information acquiring unit acquires the packet reporting control information in one or more of the following manners: reading local configuration information of the forwarder, where the local configuration information includes the packet reporting control information; receiving a configuration message from the controller, where the configuration message carries the packet reporting control information; and receiving a flow entry installation message from the controller, where the flow entry installation message carries the packet reporting control information.

For the forwarder, in a possible implementation manner, the forwarder further includes: an unreported packet buffering unit, connected to the reporting control unit, and configured to: after the reporting control unit enables the forwarder to stop sending the packet reporting message related to the flow, buffer an unreported packet of the flow into a buffer associated with or having a same identifier as a buffer of a reported packet of the flow, where the unreported packet refers to a packet for which a corresponding packet reporting message is not sent, and the reported packet refers to a packet for which a corresponding packet reporting message is sent.

For the forwarder, in a possible implementation manner, the packet reporting control information further includes a reporting threshold; and the forwarder further includes an unreported packet reporting unit, where the unreported packet reporting unit is configured to enable, in a case in which a quantity of unreported packets of the flow reaches the reporting threshold, the forwarder to send an unreported packet reporting message to the controller, where the unreported packet refers to a packet for which a corresponding packet reporting message is not sent, and the unreported packet reporting message includes flow matching information and packet statistics.

For the forwarder, in a possible implementation manner, the packet reporting control information further includes a reporting indication; and the forwarder further includes a reporting pause reporting unit, where the reporting pause reporting unit is configured to enable, in a case in which the control parameter reaches the control threshold, the forwarder to send a reporting pause reporting message to the controller, where the reporting pause reporting message includes flow matching information and a reporting pause reason.

In order to solve the foregoing technical problem, according to still another embodiment of the present invention, a packet processing device is provided, including a communications interface, a processor, and a computer readable medium that are connected by using a bus, where the computer readable medium is configured to store program code; and the processor is configured to perform the packet processing method by executing the program code.

In order to solve the foregoing technical problem, according to still another embodiment of the present invention, a packet processing device is provided, including: a receiver, configured to receive a user packet; a transmitter, configured to send a packet reporting message to a controller that decouples control from forwarding together with the packet processing device; and a processor, configured to acquire packet reporting control information, where the packet reporting control information includes a reporting control indication and a control threshold, and the processor is further configured to enable, according to the reporting control indication in a case in which a control parameter reaches or exceeds the control threshold, the transmitter to stop sending a packet reporting message related to one flow.

For the packet processing device, in a possible implementation manner, the control threshold is maximum reporting frequency, and the control parameter is used for collecting statistics on frequency at which the packet reporting message related to the flow is sent; or, the control threshold is maximum reporting duration, and the control parameter is used for collecting statistics on duration in which the packet reporting message related to the flow is sent; or, the control threshold is a maximum quantity of reporting times, and the control parameter is used for collecting statistics on a quantity of times that the packet reporting message related to the flow is sent.

For the packet processing device, in a possible implementation manner, the processor acquires the packet reporting control information in one or more of the following manners: reading local configuration information of the packet processing device, where the local configuration information includes the packet reporting control information; receiving a configuration message from the controller, where the configuration message carries the packet reporting control information; and receiving a flow entry installation message from the controller, where the flow entry installation message carries the packet reporting control information.

For the packet processing device, in a possible implementation manner, the packet reporting control information further includes a reporting indication; and the processor is further configured to enable, in a case in which the control parameter reaches the control threshold, the transmitter to send a reporting pause reporting message to the controller, where the reporting pause reporting message includes flow matching information and a reporting pause reason.

For the packet processing device, in a possible implementation manner, the packet reporting control information further includes a reporting threshold; and the processor is further configured to enable, in a case in which a quantity of unreported packets of the flow reaches the reporting threshold, the transmitter to send an unreported packet reporting message to the controller, where the unreported packet refers to a packet for which a corresponding packet reporting message is not sent, and the unreported packet reporting message includes flow matching information and packet statistics.

For the packet processing device, in a possible implementation manner, the processor is further configured to: after the transmitter stops sending the packet reporting message related to the flow, buffer an unreported packet of the flow into a buffer associated with or having a same identifier as a buffer of a reported packet of the flow, where the unreported packet refers to a packet for which a corresponding packet reporting message is not sent, and the reported packet refers to a packet for which a corresponding packet reporting message is sent.

In order to solve the foregoing technical problem, according to yet another embodiment of the present invention, a packet processing system is provided, including: the forwarder according to any one of the foregoing possible implementation manners; and the controller that decouples control from forwarding together with the forwarder.

In order to solve the foregoing technical problem, according to still yet another embodiment of the present invention, a packet processing system is provided, including: the packet processing device according to any one of the foregoing possible implementation manners; and the controller that decouples control from forwarding together with the packet processing device.

By controlling, according to the packet reporting control information, sending of packet reporting messages belonging to a same flow, according to the packet processing method, the forwarder, the packet processing device, and the packet processing system in the foregoing embodiments of the present invention, unnecessary packet reporting can be effectively reduced, which effectively increases efficiency of requesting a flow entry, lowers load of an interface for controlling a forwarder, reduces resources occupied by the controller and the forwarder, and improves stability of system running.

Other features and aspects of the present invention become clear according to detailed description of the exemplary embodiments that is made with reference to the accompanying drawings below.

BRIEF DESCRIPTION OF THE DRAWINGS

The accompanying drawings of the specification that are included in the specification and form a part of the specification and the specification together show exemplary embodiments, features, and aspects of the present invention, and are used for explaining the principle of the present invention.

DETAILED DESCRIPTION OF ILLUSTRATIVE EMBODIMENTS

The following describes various exemplary embodiments, features, and aspects of the present invention in detail with reference to the accompanying drawings. A same mark in the accompanying drawings indicates a component having a same or similar function. Even though various aspects of the embodiments are shown in the accompanying drawings, unless otherwise specified, the accompanying drawings do not need to be drawn proportionally.

The specific term "exemplary" herein means "used as an example or embodiment or illustrative". Any embodiment described herein as "exemplary" is not necessarily explained as being superior or better than other embodiments.

In addition, for better description of the present invention, a lot of specific details are provided in the following specific implementation manners. A person skilled in the art should understand that the present invention may also be implemented without the specific details. In some other embodiments, methods, means, components, and circuits known by people are not described in detail for the convenience of highlighting the major idea of the present invention.

As described in the background, for a network system in a control and forwarding decoupled architecture, in the prior art, each user packet that cannot match a flow entry stored in a flow table triggers one packet reporting message, making it easy for a control interface of the entire system be in an overload state in some scenarios, and detailed description and explanation are provided below by using the OpenFlow (openflow, OF for short below) protocol as an example.

The OF protocol is a most typical protocol that is the most frequently applied on an SDN network. Network elements in the OF protocol include an OF controller (OpenFlow controller) and an OF switch (OpenFlow Switch). The OF controller is responsible for determining a forwarding action (such as forwarding, discarding, modifying a packet header, encapsulating, or decapsulating) of a service flow according to a feature of a packet (such as an IP quintuple, an Ethernet frame header, or a VLAN ID), and delivering a corresponding flow entry (including flow matching information (such as an IP quintuple or an Ethernet frame header) and an action that is correspondingly performed) to the OF switch. The OF switch acquires and stores the flow entry, and performs a corresponding action on a subsequent packet conforming to the flow entry, so as to forward the packet.

Figure 1:
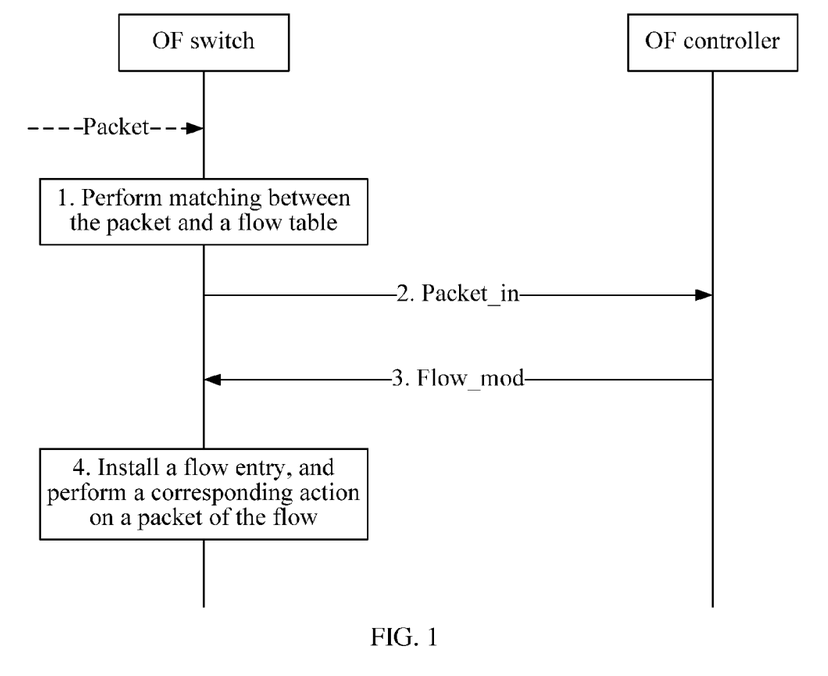
FIG. 1 shows a schematic sequence diagram of a packet processing method based on the OF protocol in the prior art.

FIG. 1 shows a schematic sequence diagram of a packet processing method based on the OF protocol in the prior art. As shown in FIG. 1, a basic process of forwarding and controlling a user packet based on the OF protocol includes:

1. When an OF switch receives a user packet (packet data), the OF switch determines whether a flow entry (flow entry) that can match the packet exists in a flow table.

Matching may be determined according to a combination of any information in an Ethernet frame header of the packet, IP header information, or a TCP/UDP port number.

2. If no flow entry that can match the packet exists in the flow table, the OF switch locally stores the packet, and obtains a corresponding buffer ID, and the OF switch reports the buffer ID, the packet, and a requesting reason (OFPR_NO_MATCH indicates "no matching flow table") to an OF controller by using a packet reporting message such as Packet_in (buffer_id, OFPR_NO_MATCH).

3. The OF controller determines, according to a feature of the packet, an action that should be performed on the packet, for example, forwarding to a specified port, discarding, modifying, encapsulating, or decapsulating. The OF controller generates the flow entry based on the determined action that should be performed, and sends the generated flow entry and the buffer id to the OF switch by using a flow entry message such as Flow_mod (buffer_id, flow entry).

The flow entry includes matching entry information corresponding to a flow, such as a combination of any information in an Ethernet frame header, IP header information, or a TCP/UDP port number.

4. The OF switch stores (installs) the flow entry in the flow table, acquires, from a buffer corresponding to the buffer id, a packet for triggering a request, and performs the action, which is included in the flow entry, on the packet.

According to the foregoing process of forwarding and controlling a packet, before the OF switch receives the flow entry installation message Flow_mod and successfully installs the flow entry, packets of a same flow also cause multiple Packet_ins, which not only consumes computing resources of the OF switch and the OF controller, but also occupies signaling transmission resources, making a control interface of an entire system be in an overload state.

In order to effectively reduce packet reporting in a control and forwarding decoupled architecture, according to an aspect of the present invention, a packet processing method is provided. The packet processing method includes: acquiring, by a forwarder, packet reporting control information including at least a reporting control indication and a control threshold; and stopping, by the forwarder according to the reporting control indication in a case in which a control parameter reaches or exceeds the control threshold, sending a packet reporting message related to one flow to a controller.

The control threshold may include one or more of maximum reporting frequency, maximum reporting duration, and a maximum quantity of reporting times, where the maximum reporting frequency indicates maximum frequency at which the forwarder is allowed to send a packet reporting message for one flow, and when the control threshold includes the maximum reporting frequency, the control parameter is used for collecting statistics on frequency at which a packet reporting message related to one flow is sent; the maximum reporting duration indicates maximum duration in which the forwarder is allowed to send a packet reporting message for one flow, and when the control threshold includes the maximum reporting duration, the control parameter is used for collecting statistics on duration in which a packet reporting message related to one flow is sent; the maximum quantity of reporting times indicates a maximum quantity of times that the forwarder is allowed to send a packet reporting message for one flow, and when the control threshold includes the maximum quantity of reporting times, the control parameter is used for collecting statistics on a quantity of times that a packet reporting message related to one flow is sent.

In addition, the forwarder may acquire the packet reporting control information in one or more of the following manners: reading, by the forwarder, local configuration information including the packet reporting control information; receiving, by the forwarder from the controller, a configuration message carrying the packet reporting control information; and receiving, by the forwarder from the controller, a flow entry installation message carrying the packet reporting control information.

In this way, by controlling, according to the packet reporting control information, sending of packet reporting messages belonging to a same flow, according to the packet processing method, generation of a large quantity of packet reporting messages caused by, for example, a burst packet, can be effectively avoided, which effectively lowers load of an interface for controlling a forwarder, reduces resources occupied by the controller and the forwarder, and improves stability of system running.

For the packet processing method, in a possible implementation manner, after stopping sending of the packet reporting message related to the flow, the forwarder may buffer an unreported packet of the flow into a buffer associated with or having a same identifier as a buffer of a reported packet of the flow. The unreported packet refers to a packet for which a corresponding packet reporting message is not sent, and the reported packet refers to a packet for which a corresponding packet reporting message is sent. In this way, when the forwarder receives the flow entry installation message sent by the controller, a processing action such as forwarding, discarding, modifying, encapsulating, or decapsulating defined in the flow entry installation message may be performed on the buffered reported packet and unreported packet that belong to the flow.

In another possible implementation manner, the forwarder may discard the unreported packet of the flow after stopping sending the packet reporting message related to the flow. In this case, after acquiring a flow entry, the forwarder only needs to perform a processing action on the buffered reported packet. Compared with an implementation manner of buffering an unreported packet, this implementation manner can appropriately lower buffering pressure of the forwarder even though this implementation manner may cause retransmission of a service flow.

In a possible implementation manner, the packet reporting control information may further include a reporting indication. In this case, the packet processing method may further include: sending, by the forwarder, a reporting pause reporting message to the controller in a case in which the control parameter reaches the control threshold. The reporting pause reporting message may include one or more of flow matching information, a reporting pause reason, and packet statistics.

In a possible implementation manner, the packet reporting control information may further include a reporting threshold. In this case, the packet processing method may further include: sending, by the forwarder, an unreported packet reporting message to the controller in a case in which a quantity of unreported packets of the flow reaches the reporting threshold. The unreported packet reporting message may include one or more of flow matching information, packet statistics, and a reason for sending a report.

Embodiment 1

Figure 2:
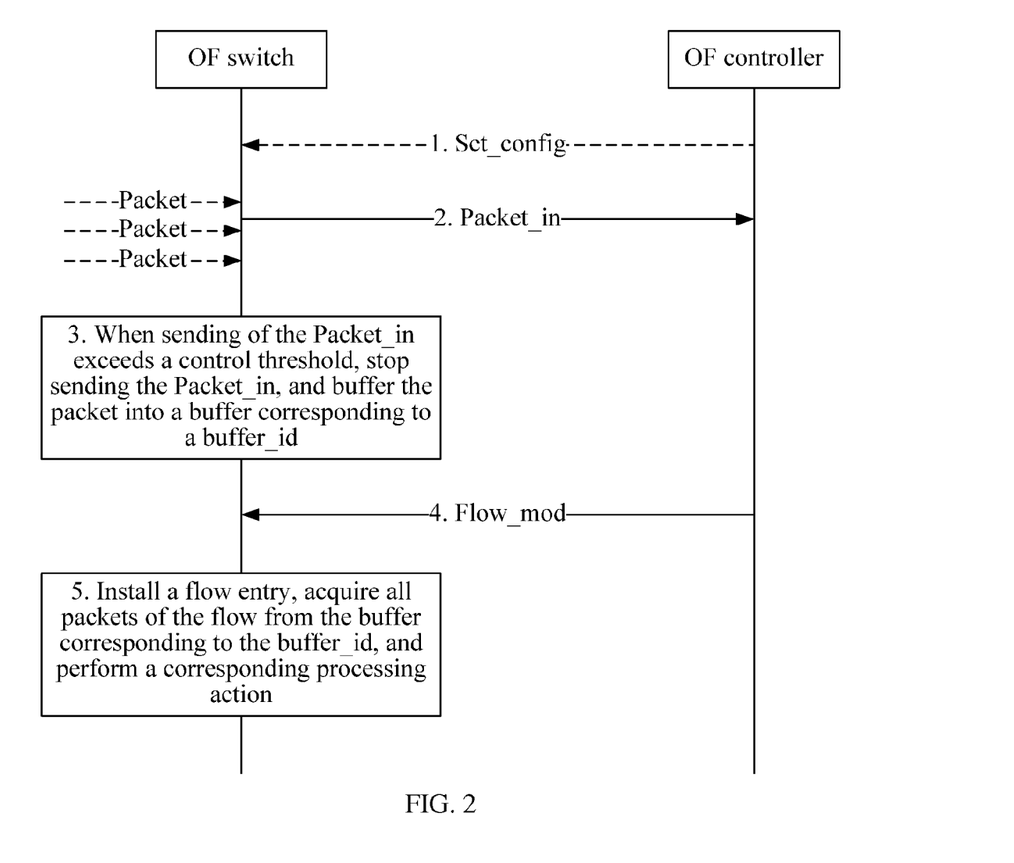
FIG. 2 shows a schematic sequence diagram of a packet processing method in a control and forwarding decoupled architecture according to an embodiment of the present invention.

FIG. 2 shows a schematic sequence diagram of a packet processing method in a control and forwarding decoupled architecture according to an embodiment of the present invention.

In this embodiment, the OpenFlow protocol is used as an example. An OF switch acquires packet reporting control information by receiving a configuration message from an OF controller, and buffers unreported packets belonging to a same flow into a buffer having a same ID as a buffer of a reported packet of the flow. The unreported packet refers to a packet for which a corresponding packet reporting message is not sent, and the reported packet refers to a packet for which a corresponding packet reporting message is sent. As shown in FIG. 2, a basic process of the packet processing method includes:

1. When an OF switch establishes a connection to an OF controller, the OF controller sends packet reporting control information such as Set_config (packet reporting control information) to the OF switch by using a configuration message.

The packet reporting control information may include information such as a reporting control indication and a control threshold. In a possible implementation manner, maximum reporting frequency of one time per second may be set as the control threshold.

2. After a user packet arrives at the OF switch, the OF switch performs matching between the packet and a flow table, and if no matching flow entry is found, buffers the packet into a buffer and sends a packet reporting message Packet_in to the OF controller, so as to acquire a corresponding flow entry.

The Packet_in message may carry all or some of content of the packet and/or a buffer_id of the corresponding buffer, and may further carry a reporting reason NO_MATCH, such as Packet_in (packet, buffer_id, reason=NO_MATCH).

3. For a subsequent packet belonging to a same flow as the packet, in a case in which the reporting control indication in the packet reporting control information is true (which indicates that sending of the packet reporting message to the OF controller needs to be controlled), the OF switch controls sending of the Packet_in according to the control threshold in the packet reporting control information.

In a possible implementation manner, when a control parameter used for collecting statistics on, for example, frequency, duration, and/or a quantity of times of sending the Packet_in related to the flow reaches or exceeds the control threshold, the OF switch stops sending the Packet_in related to the flow, and buffers an unreported packet belonging to the flow into the buffer corresponding to the buffer_id. For example, maximum reporting frequency of one time per second may be set as the control threshold, that is, the Packet_in is allowed to be sent only once per second. In this case, the control parameter needs to be used for collecting statistics on the frequency at which the Packet_in related to the flow is sent.

4. The OF controller specifies, according to the received Packet_in message, a flow entry corresponding to the packet, and delivers, by using a Flow_mod message, the buffer_id and the flow entry that correspond to the packet to the OF switch.

5. The OF switch installs, in the flow table, the flow entry delivered by the OF controller, acquires all stored packets from the buffer corresponding to the buffer_id, and performs a processing action such as forwarding, discarding, modifying, encapsulating, or decapsulating corresponding to the flow entry on these packets.

Even though the foregoing description is provided by setting the maximum reporting frequency as the control threshold, a person skilled in the art should understand that, specific setting of the control threshold should not be limited thereto, and may completely use other parameters, such as a maximum quantity of reporting times or maximum reporting duration, and may even further use any combination of these parameters, provided that the used parameter or parameter combination can suppress sending of the packet reporting message.

By controlling, according to the packet reporting control information, sending of packet reporting messages belonging to a same flow, according to the packet processing method in this embodiment of the present invention, unnecessary packet reporting can be effectively reduced, and efficiency of requesting a flow entry is increased.

In addition, for this embodiment and any one of the following embodiments, in a possible implementation manner, the unreported packet may also be directly discarded, so as to lower buffering pressure. In this case, after acquiring the flow entry, the OF switch only needs to perform a processing action on the buffered reported packet.

Embodiment 2

Figure 3:
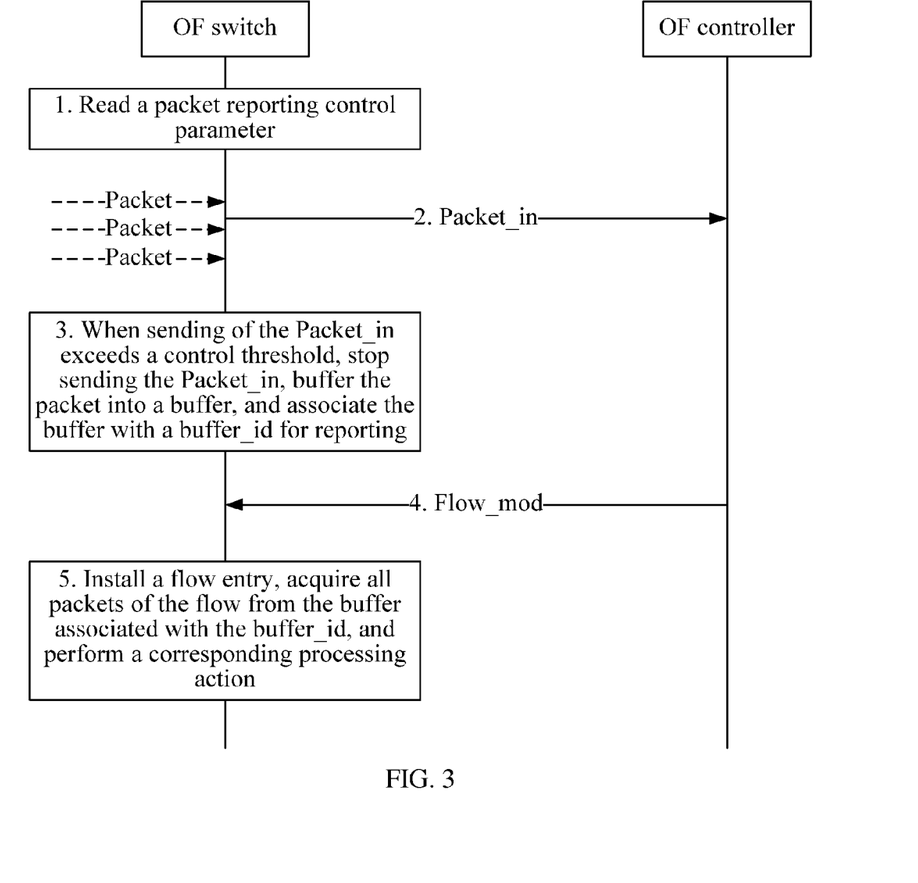
FIG. 3 shows a schematic sequence diagram of a packet processing method in a control and forwarding decoupled architecture according to another embodiment of the present invention.

FIG. 3 shows a schematic sequence diagram of a packet processing method in a control and forwarding decoupled architecture according to another embodiment of the present invention.

In this embodiment, the OpenFlow protocol is used as an example. An OF switch acquires packet reporting control information by reading local configuration information, and buffers unreported packets belonging to a same flow into a buffer associated with a buffer of a reported packet of the flow. As shown in FIG. 3, a basic process of the packet processing method includes:

1. Before performing packet reporting to an OF controller, an OF switch acquires packet reporting control information from local configuration information.

The packet reporting control information may include information such as a reporting control indication and a control threshold. In a possible implementation manner, maximum reporting duration of 3 seconds may be set as the control threshold.

2. After a user packet arrives at the OF switch, the OF switch performs matching between the packet and a flow table, and if no matching flow entry is found, buffers the packet into a buffer and sends a packet reporting message Packet_in to the OF controller, so as to acquire a corresponding flow entry.

The Packet_in message may carry all or some of content of the packet and/or a buffer_id of the corresponding buffer, and may further carry a reporting reason NO_MATCH, such as Packet_in (packet, buffer_id, reason=NO_MATCH).

3. For a subsequent packet belonging to a same flow as the packet, in a case in which the reporting control indication in the packet reporting control information is true (which indicates that sending of the packet reporting message to the OF controller needs to be controlled), the OF switch controls sending of the packet reporting message according to the control threshold in the packet reporting control information.

In a possible implementation manner, when a control parameter used for collecting statistics on frequency, duration, and/or a quantity of times of sending the Packet_in related to the flow reaches or exceeds the control threshold, the OF switch stops sending the Packet_in related to the flow, buffers an unreported packet belonging to the flow into the buffer, and associates the buffer with the buffer of the reported packet of the flow. For example, the maximum reporting duration of 3 seconds may be set as the control threshold, that is, the Packet_in message is allowed to be normally sent in only the very first 3 seconds. In this case, the control parameter needs to collect statistics on the duration in which the Packet_in related to the flow is sent.

Association of the buffers can be implemented in manners which include, but are not limited to, any one of the following manners, for example, an ID of the buffer of the unreported packet of the flow and an ID of the buffer of the reported packet of the flow are recorded into a same linked list, an ID of the buffer of the unreported packet of the flow and an ID of the buffer of the reported packet of the flow are recorded into a same array, or the buffer of the unreported packet of the flow and the buffer of the reported packet of the flow are bound with a same flow identifier.

4. The OF controller specifies, according to the received Packet_in message, a flow entry corresponding to the packet, and delivers, by using a Flow_mod message, the buffer_id and the flow entry that correspond to the packet to the OF switch.

5. The OF switch installs, in the flow table, the flow entry delivered by the OF controller, acquires all stored packets from the buffer associated with the buffer_id, and performs a processing action such as forwarding, discarding, modifying, encapsulating, or decapsulating corresponding to the flow entry on these packets.

Embodiment 3

Figure 4:
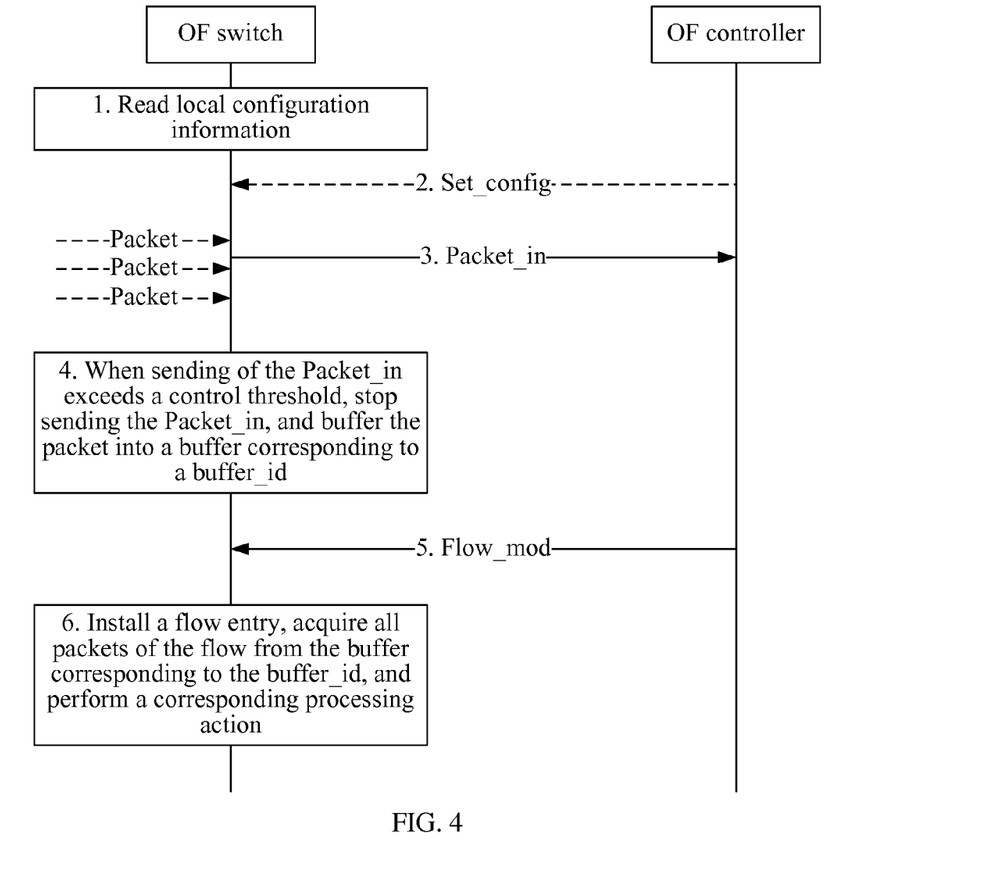
FIG. 4 shows a schematic sequence diagram of a packet processing method in a control and forwarding decoupled architecture according to still another embodiment of the present invention.

FIG. 4 shows a schematic sequence diagram of a packet processing method in a control and forwarding decoupled architecture according to still another embodiment of the present invention.

In this embodiment, the OpenFlow protocol is used as an example. An OF switch acquires packet reporting control information by reading local configuration information and by receiving a configuration message from an OF controller, and buffers unreported packets belonging to a same flow into a buffer having a same ID as a buffer of a reported packet of the flow. As shown in FIG. 4, a basic process of the packet processing method includes:

1. The OF switch acquires first packet reporting control information from local configuration information when being started.

The first packet reporting control information may include information such as a reporting control indication and a first control threshold.

2. When the OF switch establishes a connection to an OF controller, the OF controller sends second packet reporting control information such as Set_config (packet reporting control information) to the OF switch by using a configuration message.

The second packet reporting control information may include one or more of information such as a reporting control indication and a second control threshold.

Then, the OF switch combines the first packet reporting control information with the second packet reporting control information, which may specifically be: combining the first control threshold with the second control threshold, so as to determine a control threshold that needs to be effective. In a case in which the first control threshold is in conflict with the second control threshold, the OF switch needs to determine priorities of the first control threshold and the second control threshold according to a local policy, and uses one with a higher priority as the control threshold.

For example, it is assumed that the first control threshold includes maximum reporting frequency of 5 times per second and a maximum quantity of 10 reporting times, and the second control threshold includes maximum reporting frequency of 3 times per second and a maximum quantity of 5 reporting times. Through comparison, the OF controller may consider that the second control threshold has a higher priority, and accordingly set, to the maximum reporting frequency of 3 times per second and the maximum quantity of 5 reporting times, the control threshold that needs to be effective.

3. After a user packet arrives at the OF switch, the OF switch performs matching between the packet and a flow table, and if no matching flow entry is found, buffers the packet into a buffer and sends a packet reporting message Packet_in to the OF controller, so as to acquire a corresponding flow entry.

The Packet_in message may carry all or some of content of the packet and/or a buffer_id of the corresponding buffer, and may further carry a reporting reason NO_MATCH, such as Packet_in (packet, buffer_id, reason=NO_MATCH).

4. For a subsequent packet belonging to a same flow as the packet, in a case in which the reporting control indication in the packet reporting control information is true (which indicates that sending of the packet reporting message to the OF controller needs to be controlled), the OF switch controls sending of the Packet_in according to the control threshold in the packet reporting control information.

In a possible implementation manner, when a control parameter used for collecting statistics on frequency, duration, and/or a quantity of times of sending the Packet_in related to the flow reaches or exceeds the control threshold, the OF switch stops sending the Packet_in related to the flow, and buffers an unreported packet belonging to the flow into a buffer having a same ID as a buffer of a reported packet of the flow, that is, the buffer corresponding to the buffer_id. For example, the maximum reporting frequency of 3 times per second and the maximum quantity of 5 reporting times may be set as the control threshold, that is, the Packet_in is allowed to be sent only once per second, and only the first five Packet_ins are allowed to be sent. In this case, the control parameter needs to collect statistics on the frequency and a quantity of times of sending the Packet_in related to the flow.

5. The OF controller specifies, according to the received Packet_in message, a flow entry corresponding to the packet, and delivers, by using a Flow_mod message, the buffer_id and the flow entry that correspond to the packet to the OF switch.

6. The OF switch installs, in the flow table, the flow entry delivered by the OF controller, acquires all stored packets from the buffer corresponding to the buffer_id, and performs a processing action such as forwarding, discarding, modifying, encapsulating, or decapsulating corresponding to the flow entry on these packets.

Embodiment 4

Figure 5:
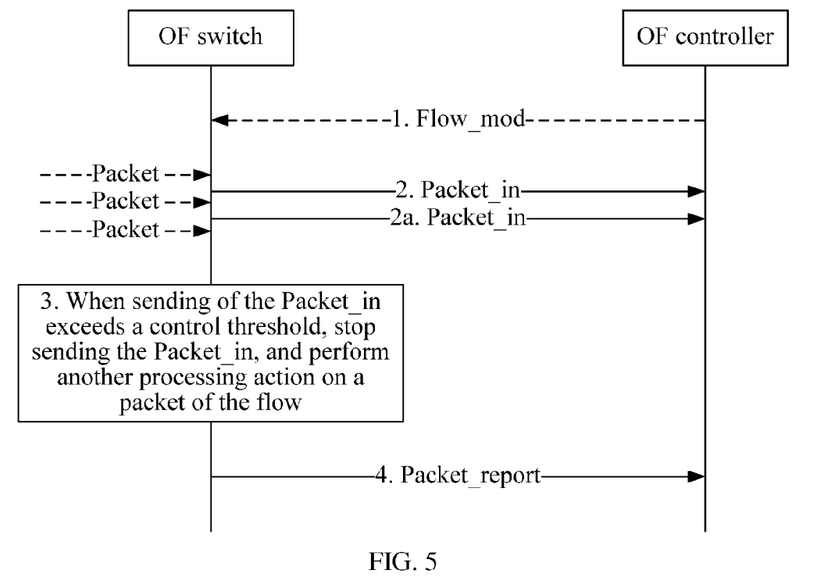
FIG. 5 shows a schematic sequence diagram of a packet processing method in a control and forwarding decoupled architecture according to yet another embodiment of the present invention.

FIG. 5 shows a schematic sequence diagram of a packet processing method in a control and forwarding decoupled architecture according to yet another embodiment of the present invention.

In this embodiment, the OpenFlow protocol is used as an example. An OF switch acquires packet reporting control information by receiving a flow entry installation message from an OF controller, and reports, to the OF controller by using an unreported packet reporting message, statistics of an unreported packet belonging to one flow. As shown in FIG. 5, a basic process of the packet processing method includes:

1. An OF controller sends a flow entry such as Flow_mod (flow entry, action: SET_TO_CONTROLLER, packet reporting control information) including packet reporting control information to an OF switch by using a flow entry installation message.

The Flow_mod message may be caused by another packet reporting message, or may be actively initiated by the OF controller, which is not limited in the present invention.

In addition, the Flow_mod message may include flow matching information, a corresponding processing action (the processing action may include performing reporting to the OF controller), and the packet reporting control information. The packet reporting control information may include information such as a reporting control indication, a control threshold, and a reporting threshold. In a possible implementation manner, maximum reporting frequency of 5 times per second may be set as the control threshold.

2. After a user packet arrives at the OF switch, the OF switch performs matching between the packet and a flow table, and if the packet may match a flow entry, performs a corresponding processing action. The processing action includes reporting the packet to the OF controller, and therefore, the OF switch sends a packet reporting message Packet_in to the OF controller.

The Packet_in message may carry all or some of content of the packet, and optionally include a buffer_id of a buffer and a reporting reason, such as Packet_in (packet, buffer_id, reason=NO_MATCH).

In addition, in a possible implementation manner, the processing action may further include another action such as forwarding, discarding, modifying, encapsulating, or decapsulating.

3. For a subsequent packet belonging to the flow, in a case in which the reporting control indication in the packet reporting control information is true (which indicates that sending of the packet reporting message to the OF controller needs to be controlled), the OF switch controls sending of the Packet_in according to the control threshold in the packet reporting control information.

In a possible implementation manner, when a control parameter used for collecting statistics on frequency, duration, and/or a quantity of times of sending the Packet_in related to the flow reaches or exceeds the control threshold, the OF switch stops sending the Packet_in related to the flow. For example, the maximum reporting frequency of 5 times per second may be set as the control threshold, that is, the Packet_in is allowed to be sent only 5 times per second. In this case, the control parameter needs to collect statistics on a quantity of times that the Packet_in related to the flow is sent.

4. Optionally, when a quantity of unreported packets of the flow reaches the reporting threshold, the OF switch sends an unreported packet reporting message Packet_report such as Packet_report (flow, packet statistics, reason) to the OF controller.

The Packet_report message may include flow matching information (such as an IP quintuple or an Ethernet frame header) and packet statistics (a quantity of packets, a size of a packet, and bandwidth occupied by a packet), and may further include a reason for sending a report, and the like.

Even though the foregoing description is provided by using an example in which all packet reporting control information is obtained from a flow entry installation message delivered by an OF controller, a person skilled in the art should understand that, some or all of control thresholds that are effective finally may be obtained from local configuration information, a configuration message delivered by the OF controller, or the flow entry installation message delivered by the OF controller, which is not limited in the present invention.

Embodiment 5

Figure 6:
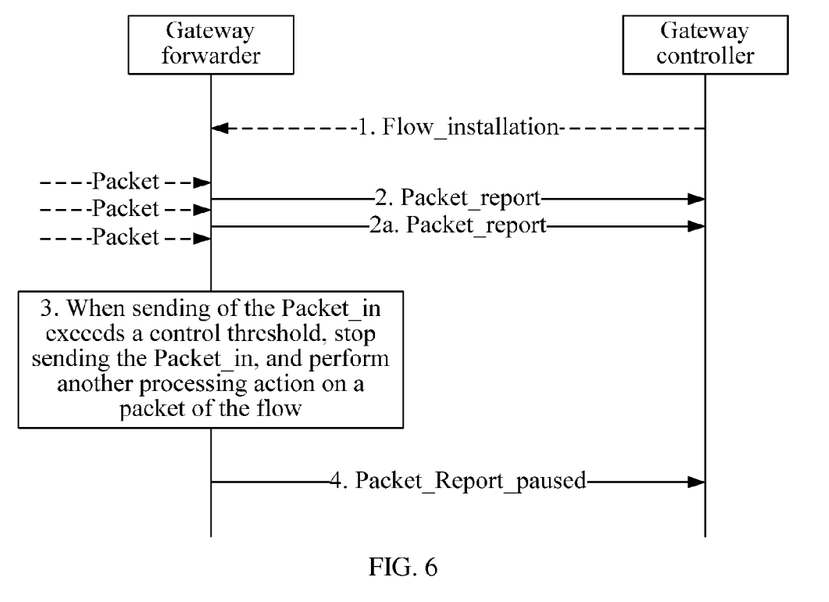
FIG. 6 shows a schematic sequence diagram of a packet processing method in a control and forwarding decoupled architecture according to still yet another embodiment of the present invention.

FIG. 6 shows a schematic sequence diagram of a packet processing method in a control and forwarding decoupled architecture according to still yet another embodiment of the present invention.

In this embodiment, the control and forwarding decoupled architecture includes a control and forwarding decoupled gateway controller (GW controller) and a gateway forwarder (GW forwarder). The GW forwarder acquires packet reporting control information by receiving a flow entry installation message from the GW controller. The GW forwarder controls sending of a packet reporting message according to the packet reporting control information, and sends a reporting pause reporting message to the GW controller. As shown in FIG. 6, a basic process of the packet processing method includes:

1. A GW controller sends a flow entry such as Flow_installation (flow entry, packet reporting control information)

including packet reporting control information to a GW forwarder by using a flow entry installation message.

The Flow_mod message may include flow matching information, a corresponding processing action (the processing action may include performing reporting to the OF controller), and packet reporting control information. The packet reporting control information may include information such as a reporting control indication, a control threshold and a reporting indication. In a possible implementation manner, a maximum quantity of 5 reporting times may be set as the control threshold.

2. After a user packet arrives at the GW forwarder, the GW forwarder matches the packet with a flow table, and sends a packet reporting message Packet_report to the GW controller according to a matching flow entry.

The Packet_report message may carry all or some of content of the packet, such as Packet_report(packet).

In a possible implementation manner, the GW controller performs another processing action on the packet, such as forwarding, discarding, encapsulating, or decapsulating.

3. For a subsequent packet belonging to the flow, in a case in which the reporting control indication in the packet reporting control information is true (which indicates that sending of the packet reporting message to the GW controller needs to be controlled), the GW forwarder controls sending of the Packet_report according to the control threshold in the packet reporting control information.

In a possible implementation manner, when a control parameter used for collecting statistics on frequency, duration, and/or a quantity of times of sending the Packet_report related to the flow reaches or exceeds the control threshold, the GW forwarder stops sending the Packet_report related to the flow. For example, the maximum quantity of 5 reporting times may be set as the control threshold, that is, only the first five Packet_reports are allowed to be sent. In this case, the control parameter needs to collect statistics on a quantity of times that the Packet_report related to the flow is sent.

4. In a possible implementation manner, in a case in which the reporting indication in the packet reporting control information is true (which indicates that an event that sending of a packet reporting message is paused needs to be reported to the GW controller), when the control parameter reaches the control threshold, the GW forwarder sends a reporting pause reporting message Packet_report_paused to the GW controller.

The Packet_report_paused message may include flow matching information (such as an IP quintuple or an Ethernet frame header), a reporting pause reason, and the like, and may further include packet statistics (such as a quantity of packets, a size of a packet, and bandwidth occupied by a packet), such as Packet_report_paused (flow, packet statistics, reason).

Even though the foregoing description is provided by using an example in which all packet reporting control information is obtained from a flow entry installation message delivered by a GW controller, a person skilled in the art should understand that, some or all of control thresholds that are effective finally may be obtained from local configuration information, a configuration message delivered by the GW controller, or the flow entry installation message delivered by the GW controller, which is not limited in the present invention.

Embodiment 6

Figure 7:
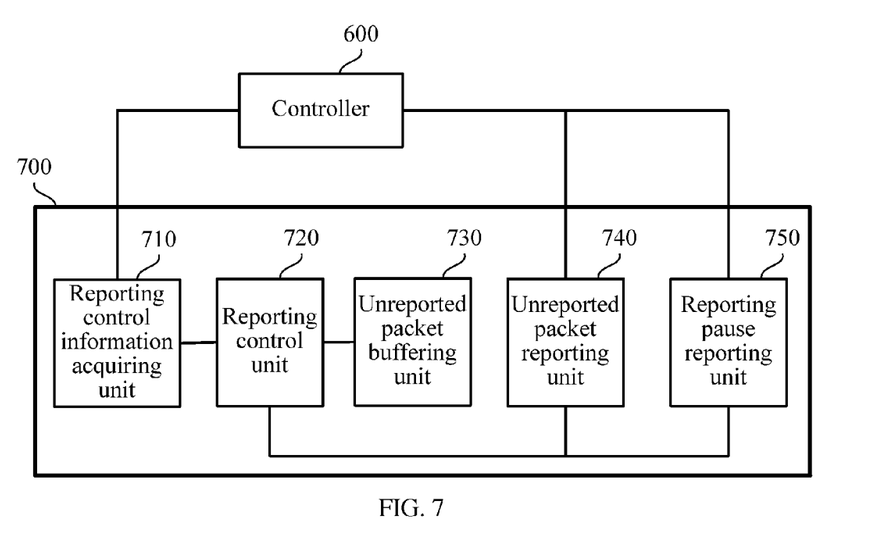
FIG. 7 shows a schematic structural block diagram of a forwarder according to an embodiment of the present invention.

FIG. 7 shows a schematic structural block diagram of a forwarder according to an embodiment of the present invention. As shown in FIG. 7, a forwarder 700 is applicable to a control and forwarding decoupled architecture that further includes a controller 600 that decouples control from forwarding together with the forwarder 700, and may include a reporting control information acquiring unit 710 and a reporting control unit 720.

The reporting control information acquiring unit 710 is configured to acquire packet reporting control information, where the packet reporting control information may include information such as a reporting control indication and a control threshold. The reporting control unit 720 is connected to the reporting control information acquiring unit 710, and is configured to enable, according to the reporting control indication in a case in which a control parameter reaches or exceeds the control threshold, the forwarder 700 to stop sending a packet reporting message related to one flow to the controller 600.

The control threshold may include one or more of maximum reporting frequency, maximum reporting duration, and a maximum quantity of reporting times, where the maximum reporting frequency indicates maximum frequency at which the forwarder 700 is allowed to send a packet reporting message for one flow, and when the control threshold includes the maximum reporting frequency, the control parameter is used for collecting statistics on frequency at which a packet reporting message related to one flow is sent; the maximum reporting duration indicates maximum duration in which the forwarder is allowed to send a packet reporting message for one flow, and when the control threshold includes the maximum reporting duration, the control parameter is used for collecting statistics on duration in which a packet reporting message related to one flow is sent; the maximum quantity of reporting times indicates a maximum quantity of times that the forwarder is allowed to send a packet reporting message for one flow, and when the control threshold includes the maximum quantity of reporting times, the control parameter is used for collecting statistics on a quantity of times that a packet reporting message related to one flow is sent.

By controlling, according to the packet reporting control information, sending of packet reporting messages belonging to a same flow, according to the forwarder in this embodiment of the present invention, unnecessary packet reporting can be effectively reduced, and efficiency of requesting a flow entry is increased.

In addition, the reporting control information acquiring unit 710 may acquire the packet reporting control information in one or more of the following manners: reading local configuration information of the forwarder 700, where the local configuration information includes the packet reporting control information; receiving a configuration message from the controller 600, where the configuration message carries the packet reporting control information; and receiving a flow entry installation message from the controller 600, where the flow entry installation message carries the packet reporting control information.

In a possible implementation manner, as shown in FIG. 7, the forwarder 700 may further include an unreported packet buffering unit 730. The unreported packet buffering unit 730 is connected to the reporting control unit 720, and is configured to: after the reporting control unit 720 enables the forwarder 700 to stop sending the packet reporting message related to the flow, buffer an unreported packet of the flow into a buffer associated with or having a same identifier as a buffer of a reported packet of the flow. The unreported packet refers to a packet for which a corresponding packet reporting message is not sent, and the reported packet refers to a packet for which a corresponding packet reporting message is sent. In this implementation manner, after receiving the flow entry installation message sent by the controller 600, the forwarder 700 may perform a processing action, which is defined in the flow entry installation message, on the buffered reported packet and unreported packet that belong to the flow.

In addition, in a possible implementation manner, as shown in FIG. 7, the forwarder 700 may further include an unreported packet reporting unit 740. In this implementation manner, the packet reporting control information may further include a reporting threshold, so that, in a case in which a quantity of unreported packets of the flow reaches the reporting threshold, the unreported packet reporting unit 740 may enable the forwarder 700 to send an unreported packet reporting message to the controller 600. The unreported packet reporting message may include flow matching information and packet statistics, and may further include a reason for sending a report.

In addition, in a possible implementation manner, as shown in FIG. 7, the forwarder 700 may further include a reporting pause reporting unit 750. In this implementation manner, the packet reporting control information may further include a reporting indication, so that, in a case in which the control parameter reaches the control threshold, the reporting pause reporting unit 750 may enable the forwarder 700 to send a reporting pause reporting message to the controller 600. The reporting pause reporting message may include flow matching information and a reporting pause reason, and may further include packet statistics.

Embodiment 7

Figure 8:
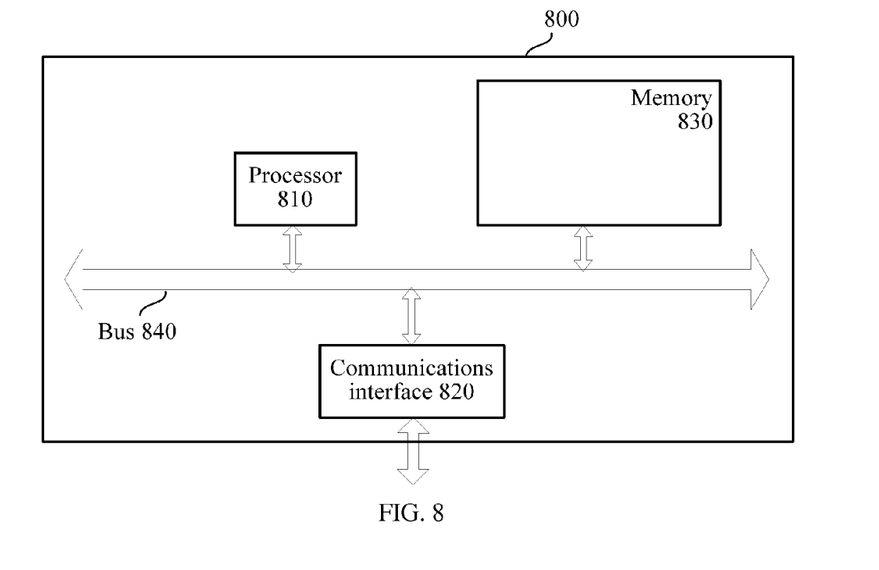
FIG. 8 shows a structural block diagram of a packet processing device according to an embodiment of the present invention.

FIG. 8 shows a structural block diagram of a packet processing device according to an embodiment of the present invention. The packet processing device 800 may be a host server, a personal computer PC, a portable computer or terminal, or the like with a computing capability. Specific implementation of a computing node is not limited in specific embodiments of the present invention.

The packet processing device 800 includes a processor (processor) 810, a communications interface (Communications Interface) 820, a memory 830, and a bus 840. The processor 810, the communications interface 820, and the memory 830 perform mutual communication by using the bus 840.

The communications interface 820 is configured to communicate with a network element, where the network element includes, for example, a virtual machine management center, and a shared memory.

The processor 810 is configured to execute a program. The processor 810 may be a central processing unit CPU, or an application specific integrated circuit ASIC (Application Specific Integrated Circuit), or one or more integrated circuits configured to implement the embodiments of the present invention.

The memory 830 is configured to store the program and/or data. The memory 830 may include a high-speed RAM memory, and may also include a non-volatile memory (non-volatile memory), such as at least one magnetic memory. The memory 830 may also be a memory array. The memory 830 may further be divided into blocks, and the blocks may be combined into a virtual volume according to a rule.

In a possible implementation manner, the program may be program code including a computer operation instruction. The program may be specifically configured to: enable a forwarder in a control and forwarding decoupled architecture to acquire packet reporting control information, where the packet reporting control information includes a reporting control indication and a control threshold; and enable, according to the reporting control indication in a case in which a control parameter used for collecting statistics on, for example, frequency, duration, and/or a quantity of times of sending a packet reporting message related to one flow reaches or exceeds the control threshold, the forwarder to stop sending the packet reporting message related to the flow to a controller.

Embodiment 8

Figure 9:
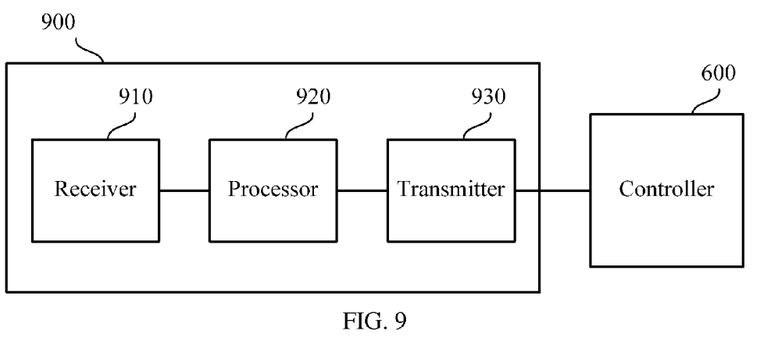
FIG. 9 shows a structural block diagram of a packet processing device according to another embodiment of the present invention.

FIG. 9 shows a structural block diagram of a packet processing device according to another embodiment of the present invention. The packet processing device 900 may be a forwarder in a control and forwarding decoupled architecture.

As shown in FIG. 9, the packet processing device 900 may include a receiver 910, a processor 920, and a transmitter 930. The receiver 910 is configured to receive a user packet; the transmitter 930 is configured to send a packet reporting message to a controller 600 that decouples control from forwarding together with the packet processing device 900; and the processor 920 is configured to acquire packet reporting control information, where the packet reporting control information may include a reporting control indication and a control threshold. In addition, the processor 920 is further configured to enable, according to the reporting control indication in a case in which a control parameter reaches or exceeds the control threshold, the transmitter 930 to stop sending a packet reporting message related to a flow to the controller 600.

In a possible implementation manner, the control threshold may include one or more of maximum reporting frequency, maximum reporting duration, and a maximum quantity of reporting times, where the maximum reporting frequency indicates maximum frequency at which the transmitter 930 is allowed to send a packet reporting message for one flow, and when the control threshold includes the maximum reporting frequency, the control parameter is used for collecting statistics on frequency at which a packet reporting message related to one flow is sent; the maximum reporting duration indicates maximum duration in which the transmitter 930 is allowed to send a packet reporting message for one flow, and when the control threshold includes the maximum reporting duration, the control parameter is used for collecting statistics on duration in which a packet reporting message related to one flow is sent; the maximum quantity of reporting times indicates a maximum quantity of times that the transmitter 930 is allowed to send a packet reporting message for one flow, and when the control threshold includes the maximum quantity of reporting times, the control parameter is used for collecting statistics on a quantity of times that a packet reporting message related to one flow is sent.

By controlling, according to the packet reporting control information, sending of packet reporting messages belonging to a same flow, according to the forwarder in this embodiment of the present invention, unnecessary packet reporting can be effectively reduced, and efficiency of requesting a flow entry is increased.

In addition, the processor 920 may acquire the packet reporting control information in one or more of the following manners: reading local configuration information of the packet processing device 900, where the local configuration information includes the packet reporting control information; receiving a configuration message from the controller 600, where the configuration message carries the packet reporting control information; and receiving a flow entry installation message from the controller 600, where the flow entry installation message carries the packet reporting control information.

In a possible implementation manner, the packet reporting control information may further include a reporting indication. In this case, the processor 920 may further be configured to enable, when the control parameter reaches the control threshold, the transmitter 930 to send a reporting pause reporting message to the controller 600, where the reporting pause reporting message may include flow matching information and a reporting pause reason.

In a possible implementation manner, the packet reporting control information may further include a reporting threshold. In this case, the processor 920 may further be configured to enable, when a quantity of unreported packets of the flow reaches the reporting threshold, the transmitter 930 to send an unreported packet reporting message to the controller 600, where the unreported packet refers to a packet for which a corresponding packet reporting message is not sent, and the unreported packet reporting message includes flow matching information and packet statistics.

In addition, in a possible implementation manner, the processor is further configured to: after the transmitter stops sending the packet reporting message related to the flow, buffer an unreported packet of the flow into a buffer associated with or having a same identifier as a buffer of a reported packet of the flow, where the unreported packet refers to a packet for which a corresponding packet reporting message is not sent, and the reported packet refers to a packet for which a corresponding packet reporting message is sent. In this implementation manner, after the receiver 910 of the packet processing device 900 receives the flow entry installation message sent by the controller 600, the processor 920 may perform a processing action, which is defined in the flow entry installation message, on the buffered reported packet and unreported packet that belong to the flow.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

When the functions are implemented in a form of computer software and sold or used as an independent product, it may be considered to a certain extent that all or some of the technical solutions of the present invention (for example, a part contributing to the prior art) may be implemented in a form of a computer software product. The computer software product is generally stored in a computer readable storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. It may also be considered that the present invention is applied to an LTE-A heterogeneous network. Any variation or replacement readily figured out by a person skilled in the art within the technical scope disclosed in the present invention shall fall within the protection scope of the present invention. Therefore, the protection scope of the present invention shall be subject to the protection scope of the claims.

According to the packet processing method, the forwarder, the controller, and the packet processing device that are provided in the embodiments of the present invention and are applicable to a communications network in a control and forwarding decoupled architecture, unnecessary packet reporting can be effectively reduced, which effectively increases efficiency of requesting a flow entry, lowers load of an interface for controlling a forwarder, reduces resources occupied by the controller and the forwarder, and improves stability of system running.

What is claimed is:

1. A packet processing method applied to a control and forwarding decoupled architecture having a forwarder and a controller, the method comprising:
    acquiring, by the forwarder, packet reporting control information, wherein the packet reporting control information comprises a reporting control indication and a control threshold;
    determining, for a received data packet, whether a flow entry in a flow table matches a flow associated with the data packet; and
    stopping, by the forwarder, and according to the reporting control indication indicating that a control parameter associated with the flow reaches or exceeds the control threshold, sending, to the controller, of a packet reporting message that is related to the data packet associated with the flow and that is determined to be needed in response to determining that the flow entry in the flow table does not match the flow.

2. The packet processing method according to claim 1, wherein the control threshold is at least one of:
    a maximum reporting frequency, wherein the control parameter is used for collecting statistics on frequency at which the packet reporting message related to the flow is sent;
    a maximum reporting duration wherein the control parameter is used for collecting statistics on duration in which the packet reporting message related to the flow is sent; or
    a maximum quantity of reporting times, wherein the control parameter is used for collecting statistics on a quantity of times that the packet reporting message related to the flow is sent.

3. The packet processing method according to claim 1, wherein the acquiring, by the forwarder, packet reporting control information comprises performing at least one of:
    reading, by the forwarder, local configuration information, wherein the local configuration information comprises the packet reporting control information;
    receiving, by the forwarder, a configuration message from the controller, wherein the configuration message carries the packet reporting control information; and receiving, by the forwarder, a flow entry installation message from the controller, wherein the flow entry installation message carries the packet reporting control information.

4. The packet processing method according to claim 1, wherein the packet reporting control information further comprises a reporting indication;
wherein the packet processing method further comprises sending, by the forwarder, a reporting pause reporting message to the controller in response to the control parameter reaching the control threshold; and
wherein the reporting pause reporting message comprises flow matching information and a reporting pause reason.

5. The packet processing method according to claim 1, wherein the packet reporting control information further comprises a reporting threshold;
wherein the packet processing method further comprises sending, by the forwarder, an unreported packet reporting message to the controller in response to a quantity of unreported packets of the flow reaching the reporting threshold;
wherein the unreported packet is the data packet, and wherein a corresponding packet reporting message is not sent for the data packet; and
wherein the unreported packet reporting message comprises flow matching information and packet statistics.

6. The packet processing method according to claim 1, further comprising:
buffering, by the forwarder and after the stopping the sending of the packet reporting message, an unreported packet of the flow into a buffer associated with or having a same identifier as a buffer of a reported packet of the flow, wherein the unreported packet is a packet for which a corresponding packet reporting message is not sent, and the reported packet refers is a packet for which a corresponding packet reporting message is sent;
receiving, by the forwarder, a flow entry installation message sent by the controller; and
performing a processing action, which is defined in the flow entry installation message, on the buffered reported packet and unreported packet.

7. The packet processing method according to claim 1, further comprising:
after the stopping the sending of the packet reporting message, discarding, by the forwarder, an unreported packet of the flow, wherein the unreported packet is a packet for which a corresponding packet reporting message is not sent.

8. A packet processing device, comprising:
a communications interface;
a processor connected by a bus to the communications interface; and
a non-transitory computer readable medium connected the processor and having stored therein program code, that when, executed, causes the processor to:
acquire packet reporting control information, wherein the packet reporting control information comprises a reporting control indication and a control threshold;
determine, for a received data packet, whether a flow entry in a flow table matches a flow associated with the data packet; and
stop, according to the reporting control indication indicating that a control parameter associated with the flow reaches or exceeds the control threshold, sending, to a controller, of a packet reporting message that is related to the data packet associated with the flow and that is determined to be needed in response to determining that the flow entry in the flow table does not match the flow.

9. A packet processing device, comprising:
a receiver, configured to receive a user packet;
a transmitter, configured to send a packet reporting message to a controller that, together with the packet processing device, decouples control from forwarding; and
a processor connected to the receiver and the transmitter; and
a non-transitory computer readable medium connected the processor and having stored therein program code, that when, executed, causes the processor to:
acquire packet reporting control information, wherein the packet reporting control information comprises a reporting control indication and a control threshold;
determine, for a received data packet, whether a flow entry in a flow table matches a flow associated with the data packet; and
enable, according to the reporting control indication indicating that a control parameter associated with the flow reaches or exceeds the control threshold, the transmitter to stop sending, to the controller, a packet reporting message that is related to the data packet associated with the flow and that is determined to be needed in response to determining that the flow entry in the flow table does not match the flow.

10. The packet processing device according to claim 9, wherein the control threshold is at least one of:
a maximum reporting frequency, and wherein the control parameter is used for collecting statistics on frequency at which the packet reporting message related to the flow is sent;
a maximum reporting duration, and wherein the control parameter is used for collecting statistics on duration in which the packet reporting message related to the flow is sent; or,
a maximum quantity of reporting times, and wherein the control parameter is used for collecting statistics on a quantity of times that the packet reporting message related to the flow is sent.

11. The packet processing device according to claim 9, wherein the non-transitory computer readable medium further has stored therein program code, that when, executed, causes the processor to acquire the packet reporting control information according to one or more of:
reading local configuration information of the packet processing device, wherein the local configuration information comprises the packet reporting control information;
receiving a configuration message from the controller, wherein the configuration message carries the packet reporting control information; and
receiving a flow entry installation message from the controller, wherein the flow entry installation message carries the packet reporting control information.

12. The packet processing device according to claim 9, wherein the packet reporting control information further comprises a reporting indication;
wherein the non-transitory computer readable medium further has stored therein program code, that when, executed, causes the processor to enable, in response to the control parameter reaching the control threshold, the transmitter to send a reporting pause reporting message to the controller; and wherein the reporting pause reporting message comprises flow matching information and a reporting pause reason.

13. The packet processing device according to claim 9, wherein the packet reporting control information further comprises a reporting threshold,
  wherein the non-transitory computer readable medium further has stored therein program code, that when, executed, causes the processor to enable, in response to a quantity of unreported packets of the flow reaching the reporting threshold, the transmitter to send an unreported packet reporting message to the controller; and
  wherein the unreported packet is a packet for which a corresponding packet reporting message is not sent, and the unreported packet reporting message comprises flow matching information and packet statistics.

14. The packet processing device according to claim 9, wherein the non-transitory computer readable medium further has stored therein program code, that when, executed, causes the processor to buffer, after the transmitter stops sending the packet reporting message related to the flow, an unreported packet of the flow into a buffer associated with or having a same identifier as a buffer of a reported packet of the flow;
  wherein the unreported packet is a packet for which a corresponding packet reporting message is not sent; and
  wherein the reported packet is a packet for which a corresponding packet reporting message is sent.

15. A packet processing system, comprising:
  the packet processing device according to claim 9; and
  a controller that, together with the packet processing device, decouples control from forwarding.

* * * * *